March 21, 1950  F. M. BLEY  2,501,374
PRELOADED LOAD LIMITING TOOL FOR DRESSING
OR CUTTING ROTATING BODIES
Filed Aug. 29, 1946  2 Sheets-Sheet 1
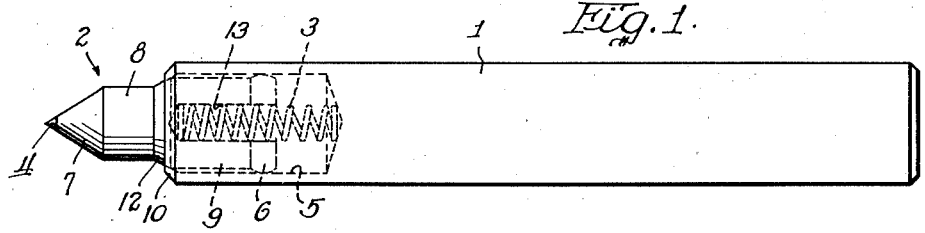
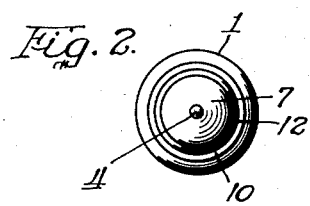
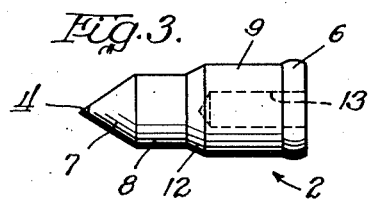
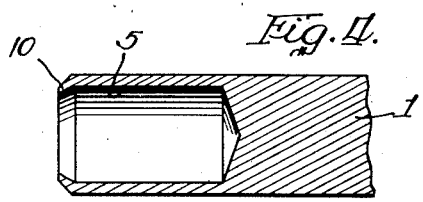
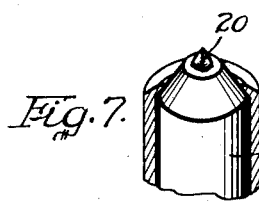
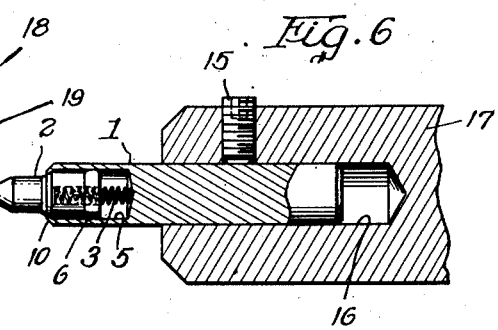
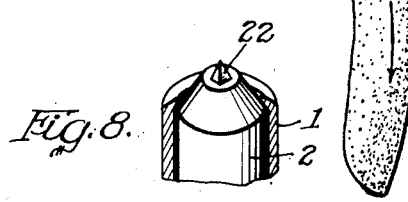
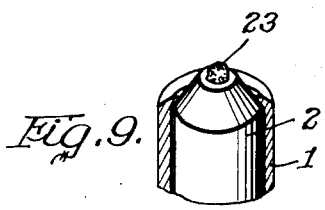
Inventor
Fred M. Bley March 21, 1950 F. M. BLEY 2,501,374
PRELOADED LOAD LIMITING TOOL FOR DRESSING
OR CUTTING ROTATING BODIES
Filed Aug. 29, 1946 2 Sheets-Sheet 2
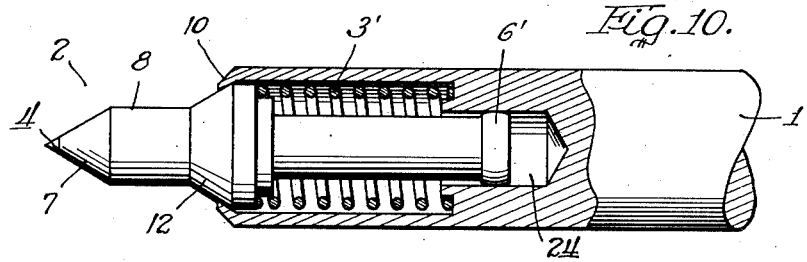
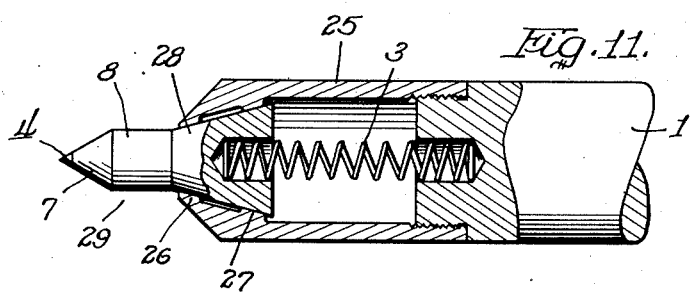
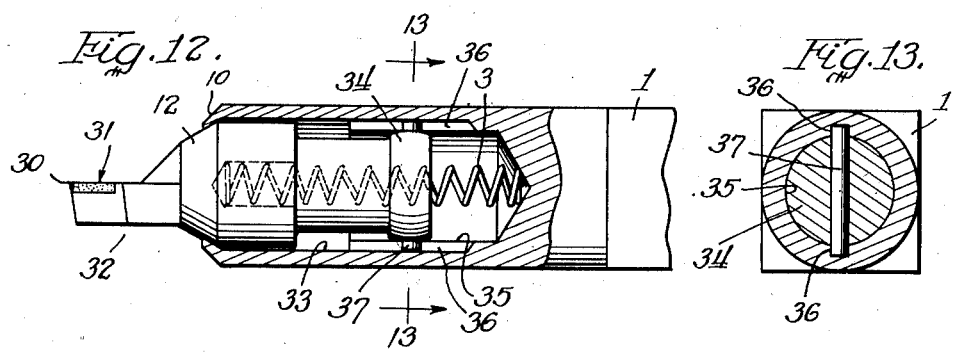
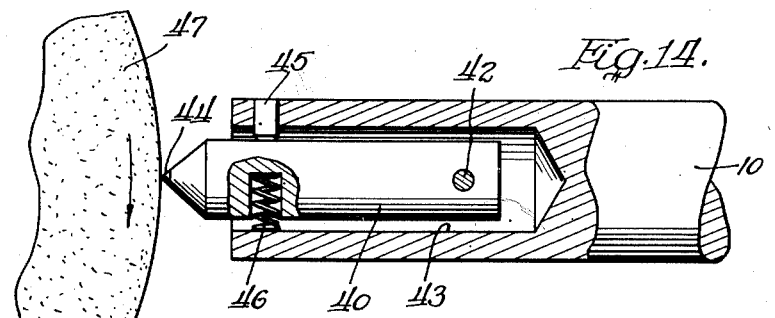
Inventor:
Fred M. Bley.
By Brown Jackson Boettcher Dienner
Att'ys.

Patented Mar. 21, 1950

2,501,374

UNITED STATES PATENT OFFICE 2,501,374

PRELOADED LOAD LIMITING TOOL FOR DRESSING OR CUTTING ROTATING BODIES

Fred M. Bley, Glenview, Ill.

Application August 29, 1946, Serial No. 693,732

2 Claims. (Cl. 125—39)

The present invention provides a preloaded load limiting tool suitable for dressing grinding wheels, finishing metal surfaces and the like. While I shall describe as the preferred embodiment of my invention an abrasive wheel dressing tool with a conical diamond point, the invention may be embodied in other forms to some of which I shall hereafter call particular attention. In designating the tool as preloaded, load limiting tool, I intend to convey the concept of a tool the working point or edge of which will yield when the load imposed upon it by the workpiece exceeds a predetermined value, but which by virtue of a prestressed spring or other preloading arrangement will act as a rigid tool for all loads imposed upon it by the work piece below the predetermined value. As soon as the overload of the work piece upon the tool is reduced below the critical predetermined value, the tool will resume its initial condition of rigidity and accurate alignment.

A wide variety of arrangements for carrying out the broad idea may be made and specialized arrangements for special purposes or conditions may be readily devised.

An important use of my invention is in diamond pointed tools for performing high speed operations upon the work piece. Where the operation to be performed is the dressing, truing or shaping of a grinding wheel, the presentation of the diamond point to the wheel is done as the work piece is rotated at high speed. The diamond is much harder than the abrasive grains of emery, aluminum oxide, silicon carbide or the like. These grains are bonded together by a binder which is softer than the abrasive grains. The effect of the diamond point engaged at very high peripheral speeds by the rotating wheel as the tool proceeds across the face of the wheel appears to be partly in breaking grains that are firmly enough held and partly in tearing out grains or parts of grains which project into contact with the point and tear out more readily.

In truing or dressing abrasive wheels, it is necessary at all stages to hold the tool accurately and move it with precision. It has always been regarded as of the utmost necessity to hold the tool in all operating positions with great rigidity, for it was believed that by rigidity of support, vibration of the tool could be avoided. In the truing operation wherein concentricity of the wheel periphery is required to be established, vibration cannot be avoided even after the grinding wheel is trued, and is perfectly concentric with its axis of rotation. The shaping or truing of grinding wheels produces vibration of the tool as long as the dressing tool is encountering the hard abrasive particles bonded with intermediate deposits of relatively soft binder. In brief, the nature of the wheel is such as to give a succession of blows upon the tool point by a succession of particles of which the wheel is composed.

In such truing and dressing operations, the vibration builds up in amplitude to produce periods or cycles of chattering and resultant gouging no matter how rigid the tool and its support may be. While a limited amount or amplitude of vibration is not damaging, the difficulty heretofore has been that the amplitude of vibration tends to build up in cycles to periods of chattering and gouging into the surface of the wheel. This is objectionable, but heretofore no certain remedy was available. Only on very soft wheels was there no danger of chattering and gouging to excessive extent. While on extremely hard wheels the only way known to diminish the chattering and gouging effect was to resort to extremely fine pointed diamonds, which because of their small contact area would split the grains of the hard bonded wheel with less resistance, but the finer the point of the diamond, the slower must be the transverse feed and the quicker the point loses its gauge.

Under those circumstances, the art would regard as of great value any means by which a coarser point could be employed without resulting in the objectionable building up of periods or cycles of chattering and gouging for that would allow more rapid traverse and furnish longer gauge keeping qualities.

In using a conventional diamond dressing tool wherein the diamond point is rigidly mounted in one end of the tool shank, the resistance created in passing the diamond point across the grinding wheel surface causes the entire tool to spring out of its original position, mainly in the direction of wheel travel. As soon as the resistance ceases, the diamond tool springs back to its former location and continues to move or whip farther in the same direction, so that the diamond tool is actually displaced in the opposite direction of the wheel travel. This process takes place with such lightning rapidity that at the next instant when the diamond again engages the wheel, the previous cycle of vibration is magnified. In this manner a very rapid cycle of vibration is built up to such an extent that the diamond tool plows deeply into the surface of the grinding wheel, until it has completely freed itself causing a large groove in the wheel, after which the diamond tool no longer makes contact with the wheel.

This same chattering and gouging cycle is repeated each time the traverse moves the diamond cutting tool laterally to a new undressed or untrued portion of the wheel.

Obviously, under the conditions outlined above, it has been a very difficult and painstaking operation to shape a grinding wheel with any degree of accuracy. To a certain extent the selection of sharply pointed diamonds has overcome this difficulty, but since the gauge keeping quality of a sharp pointed diamond on a hard cutting grinding wheel is of rather short duration, it has been extremely difficult to avoid the disturbing chattering and gouging on hard grinding wheels. Furthermore, the sharp points are easily chipped off, particularly when a point is moved abruptly into engagement with a grinding wheel.

I have conceived the possibility of preventing the building up of the excessive amplitude of vibration into such cycles or periods of chatter and gouging by the expedient of causing the tool to refuse to stand against more than a predetermined load or pressure imposed by the work piece, in this case, the grinding wheel. Thus vibration, so long as it does not build up to an objectionable amplitude, is not prevented, but if the amplitude builds up to an objectionable degree detected by the degree of load or pressure upon the point of the tool, the tool will yield or move away from the load, and will resume its normal working position after the load or pressure drops below the predetermined value at which the preloading spring is set. When the excessive load or pressure of the work piece, which is caused in this case by excessive vibration, drops below the predetermined value for which the spring is preloaded, the spring is arranged to restore the point to its normal position, and hold it rigid for all value of loads below that at which the spring is preloaded. This action of yielding and resuming position is very fast.

According to the preferred form of my invention, upon a rigid shank I mount a bit or tip of small mass, said bit or tip bearing the diamond point or edge which engages the work piece and performs the work of cutting or dressing away the surplus material required to give the desired finished surface. I may say that I regard the shaping, truing or dressing of an abrasive wheel with a diamond point as constituting a cutting operation.

The tip or bit is movable relative to the shank to escape from the work, but is held against such movement by a spring which is prestressed or preloaded to hold the bit or tip against a definite stop on the shank with a definite force which so long as it is not overcome, holds the tip and shank rigidly together in definite alignment.

Now the particular way in which the tip is mounted in the shank so as to be normally held rigidly and in accurate alignment with the shank under a definite force, may take a variety of forms, as will be apparent to one skilled in the art. The preferred embodiment which has certain definite advantages for which dressing, truing or shaping by a conical or like diamond point consists of complementary interengaging concentric shoulders on the tip or bit and on the shank respectively, one of which is tapered symmetrically of the longitudinal axis of the shank to produce coaxial alignment when the tip is forced lengthwise to bring its shoulders into engagement with the shoulders on the shank. Said shoulders are urged into and held in mutual engagement with a predetermined force by a preloaded spring. Due to the symmetry of the engaging shoulders the point is capable of yielding axially and in a direction laterally of its longitudinal axis. A supplementary axial guide may be provided to facilitate and insure restoring of the tip accurately to its normal aligned position relative to the shank.

Now where the diamond cutting element is shaped with an edge to cut metal as in the case of a diamond tipped finishing tool for finishing circular surfaces such as aluminum pistons or finishing cylindrical bores, etc., the cutting member of hard material such as diamond or tungsten carbide should also be held in accurate angular relation to the shank so that the cutting edge will be presented in predetermined relation to the work. For this purpose the interfitting shoulders may include a taper, but may be non-circular so that rotation cannot occur. They may be polygonal or conical with a flat spot. Other ways of securing non-rotative mounting of the tip or bit on the shank may be employed as, for example, by a transverse pin or pivot which allows the tip or bit to swing pivotally away from the work piece as soon as the preloading spring force is overcome.

The direction of escape of the cutting point or edge from the work is preferably generally diagonal to the longitudinal axis of the shank. This motion may be a lateral and longitudinal sliding motion, or it may be a swinging or pivotal motion. Each method has peculiar advantages as will be apparent. It is particularly to be noted that the tool of my invention is required to meet the needs of very high peripheral speeds of the work. The tip or bit should be of small inertia and should have no means of introducing an objectionable period of vibration of its own. The invention is to be distinguished from spring shank tools which are not preloaded, and hence not sharply or positively load limiting. Spring shank threading tools and the like lack the required characteristics of my invention and are not to be confused with it.

Certain very definite advantages flow from my invention. Among them are the following:

The tool of my invention provides much longer life of the diamond whether it be a point or rounded projection, as for wheel dressing, or an edge, i. e., shaped for metal finishing.

The work piece, whether an abrasive wheel or a metal work piece, is shaped or finished with great smoothness and accuracy, and without cycles of excessive vibration.

More rapid accomplishment of the operation is possible. In the case of wheel dressing or shaping more satisfactory overlaps in traversing the diamond across the face of the wheel are possible.

Breakage of diamonds by excessive loading or careless handling is greatly reduced.

In the accompanying drawings, I have illustrated and in the following specification described certain embodiments of my invention, including the preferred form thereof.

In the drawings:

Figure 1 is an enlarged side elevational view of a dressing tool having a preloaded, load limiting diamond point and embodying the preferred form of my invention;

Figure 2 is a left end elevational view of the tool of Figure 1;

Figure 3 is an enlarged side elevational view of the spring loaded tip or plunger which carries the diamond point of the dressing tool of Figure 1;

Figure 4 is a fragmentary, longitudinal sectional view through the hollow end of the shank of the dressing tool shown in Figure 1;

Figure 5 is a view similar to Figure 2, but showing a chisel shaped diamond cutting point instead of the conical point shown in Figure 2;

Figure 6 is an illustration of the application of a tool of my invention to the periphery of a grinding wheel;

Figures 7, 8 and 9, respectively, show cutting elements consisting of a bulged octahedron diamond points, a sharp edged octahedron diamond point and a tool bort;

Figure 10 is a section through a modified form of tool;

Figure 11 is a similar section through another modification;

Figure 12 is a longitudinal section through a tool of my invention employing a cutting edge;

Figure 13 is a cross section on line 13—13 of Figure 12; and

Figure 14 is a side view, partly in section, showing a further modification in which the tip is pivotally mounted.

Referring first to the embodiment shown in Figures 1 to 4, the tool comprises a shank 1 which in this case is cylindrical, a tip 2 which is mounted telescopically in the hollow end of the shank 1, and the compression spring 3 which is interposed under a predetermined stress of compression between the shank 1 and the tip 2. The tip 2, at its outermost end, carries the diamond point 4, which in the present embodiment is a conical sharp point. As shown in Figure 4, the end of the shank 1 is hollow, being provided with a bore 5, in which is received the rounded and slightly enlarged head 6 of the tip 2. The tip, as shown in Figures 2 and 3, comprises the outermost conical portion 7 which terminates in the diamond point 4. A neck porton 8 of less diameter than the cylindrical body 9, extends out of the bore 5 of the shank, but the tip is held against escape from the bore by the inturned flange 10, which is formed by deforming the lip or rim of the cylindrical walls at the outer end of the bore. The tip 2 has a conical shoulder 12 which is adapted to engage the inturned rim or flange 10, and under the pressure of the spring which is interposed between the tip and the shank, part of the said spring being disposed in the recess 13 formed in the body of the tip, the conical shoulder is forced into engagement with the inturned rim or flange 10 and thereby tends to center the tip axially in alignment with the longitudinal axis of the shank 1. It will be apparent that the inturned rim 10 might be discontinuous or might consist of concentric symmetrically disposed indentations forming fingers for cooperating with the conical shoulder 12 of the tip. Also, it is to be noted that if a continuous conical surface is provided at the rim of the walls of the bore, the shoulder to cooperate with the same for centering and aligning the tip with the shank may be a concentric shoulder or a plurality of separate shoulders symmetrically disposed. It will thus be understood that thrusting of the conical shoulder 12 into the circular socket formed by the rim 10, whether either or both are continuous or discontinuous, will result in centering of the tip in respect of the shank. The rear end of the tip carries the enlarged rounded head 6 which fits closely in the bore 5, and secures concentric axial guidance therein.

In operation, as shown in Figure 6, the shank 1 is gripped as by the set screw 15, in the socket 16 of a movable tool holder or carriage 17, which through suitable controls, is movable in and out towards the wheel 18 to be dressed, and is movable sidewise to traverse the face 19 of the wheel. The diamond point is preferably brought to bear upon the periphery of the wheel 18 with the tool axis disposed radially of the wheel, and the longitudinal feed of the tool is radial of the wheel. To state it otherwise, if the feed of the tool in and out is horizontal, then the point of the tool is brought into engagement with the periphery of the wheel in the horizontal plane of the axis of the wheel.

Heretofore, the mounting in a solid carriage or tool holder such as 17 of a diamond bearing tool has not been able to avoid the aforesaid vibration which builds up into periods of chatter and gouging. With the tool of my invention, application of the diamond point to the periphery of the wheel may result in vibration of a certain amplitude, but if the amplitude builds up to the point of chattering, the pressure which the face of the wheel exerts upon the point of the tool is great enough to overcome the prestressing force of the spring 3 and to force the tip away from engagement with the shoulder 10. This allows the tip to escape both endwise of the shank of the tool and to a small degree laterally of the axis of the shank, thereby relieving the cutting point from the momentary overload. However, the spring forces the tip back again as soon as the overload has passed, and the tip resumes its cutting position without vibration and consequent gouging. This action of relief from overload and the assumption of normal position thereafter occurs very quickly, with the result that the tool cuts smoothly, quietly and with the absence of vibration building up to the point of chatter and gouging.

The diamond point may assume various forms suitable for various operations on abrasive wheels or other work pieces. For example, in Figure 7, the diamond is a so-called bulged edge octahedron as indicated at 20. In Figure 8 the diamond point is a straight edged octahedron as indicated at 22, and the diamond point shown in Figure 9 is a tool bort, as indicated at 23. These various diamond cutting elements have their proper use, as is well understood by those skilled in the art.

The tool of Figure 5 employs a chisel shaped diamond point for cutting in a groove. Since the tip is not restrained against rotation, the chisel shaped point is able to align itself with the work.

As an example of a commercial tool embodying my invention, the device of Figure 1 may consist of a shank of a diameter of approximately 0.31 inch, and of a length approximately 2 inches. The tip may be of a length approximately .5 inch, and of a diameter at the neck of approximately 0.185 inch. In such sample, the tip weighs approximately 0.1 ounce and the entire tool 0.75 ounce. The pre-stressed spring is under an initial compression of about two and one-half to three pounds. These dimensions and sizes may obviously be selected to fit the particular service for which the tool is adapted, and the prestress of the spring may be selected accordingly.

In Figure 10 I have indicated a modified form of the tool. The tip 2 has the conical shoulder 12 back of the neck 8. The conical shoulder cooperates with the inturned rim or holding fingers 10. The body of the tip 2 is extended to the rear and has a head 6' disposed in the counterbore 24, and the spring 3' surrounds the body of the tip in the hollow end of the shank 1. The spring 3' is likewise prestressed to a predetermined degree, so that a certain amount of pressure on the diamond point 4 will be sustained as though the tip were rigid with the shank, but as soon as that point is exceeded, as by an overload of the workpiece upon the cutting element 4, the spring will yield and the tip will then permit the cutting element to escape from the workpiece long enough to relieve itself, and then the spring will force the tip back into its normal position.

In Figure 11, the shank 1 has a collet shaped extension 25, which is provided with concentric guiding rings 26, 27, guiding the tapered body 28 of the tip 29 concentrically into axial alignment with the axis of the tool 1. In this case, the tip 29 does not require a separate longitudinal guide, such as the head 6 in Figure 1, or the head 6' in Figure 10, dependence being placed entirely upon the guiding effect of the spaced rings 26, 27 upon the conical surface of the body portion 28. The prestressing spring 3 holds the tip with a predetermined force in the normal position, and as explained in connection with previous modifications, the tip remains for all intents and purposes a rigid part of the shank 1 until the work piece applies excessive load to the cutting element 4, whereupon the compression of the spring 3 is overcome and the cutting element is able to escape from the overload.

In the embodiment of Figure 12, a hard inset 31 providing a cutting edge 30 is mounted on the outer end of the tip member 32. The tip member is provided with the conical shoulder 12 cooperating with the inturned rim or fingers 10 of the outer end of the shank 1. The spring 3 is prestressed and tends to force the shoulder 12 concentrically into position in engagement with the rim or fingers 10. The main body of the tip 32 plays in the bore 33 and the enlarged head which is rounded, as indicated at 34, is guided in the counterbore 35. Diametrically opposed slots 36, 36 provide longitudinal splines. A transverse pin 37 extends through the head 34 and has its end lying in the slot or splines 36, 36, by virtue of which the head is free to move axially of the shank 1, and to have the necessary tilting motion in a lateral direction, but the tip is prevented from turning with respect to the shank. The shank 1 may be square at its rear end or otherwise formed to facilitate alignment of the cutting edge 30 in the holder.

The cutting element 31 may be a piece of shaped diamond, or alternatively, it may be a piece of hard cutting material such as tungsten carbide or other suitable high duty cutting material. For finishing soft metal pieces, such for example, as aluminum pistons, a shaped diamond cutting point or edge is highly effective in producing a smooth mirrorlike finish. The tool of Figure 12 is adapted for that service. It operates as previously described in connection with the other modifications, namely, that when the pressure exerted by the work piece upon the cutting element exceeds the load for which the prestressed spring is set, the cutting element will escape from the load and relieve itself, with immediate resumption of its normal position as soon as the overload is reduced below the critical point.

In Figure 14 I have indicated how the tip may be made load limiting with the tip 40 mounted in the shank 10 on a transverse pivotal axis 42, which may consist of a pin extending through the walls of a shank 10 and the body of the tip 40, or may consist of pivot mountings extending crosswise into sockets in the tip 40 from the side walls of the bore 43. The cutting element 44, in this case shown as a pointed diamond, may obviously be a cutting edge instead of a point, since the tip can move in only one direction, that is, swing in the plane of the paper, in Figure 14, on the transverse axis 42. Due to the short radius, downward pressure, as viewed in Figure 14, will tend to swing the cutting element 44 away from the work piece, and thereby relieve the pressure of the load. The pivoted tip 40 engages the gauge pin 45 set in the side wall of the bore 43. A spring plunger 46 set partly in the recess in the tip 40 bears against the adjacent side wall of the bore 43. This spring being prestressed to hold the tip 40 with a definite pressure against the gauge pin 45, provides the necessary preloading. When the work piece 47 produces a downward pressure due to the direction of rotation downwardly as indicated by the arrow, excessive pressure upon the cutting element 44 will cause the spring 46 to yield at the critical pressure and allow the tip 40 to swing downwardly in an arc on its pivot 42 as a center, thereby escaping from the pressure imposed upon it by the work piece.

While I have shown in Figures 12 and 14 specific methods of preventing turning of the cutting element or the tip supporting the cutting element where it is desired to maintain the operative position of the cutting element on the face of the work piece as, for example, where the cutting element is a cutting edge, obviously other methods may be employed for securing the desired preloaded load limiting characteristic while preventing turning of the tip in the shank. The cooperating tapered shoulder 12 and the rim or fingers 10 may, for example, be provided with one or more flat spots to insure that the tool will always maintain the cutting edge in normal position in definite register with the shank 1 in predetermined position.

The use of a load limiting prestressed cutting element for finishing internal cylindrical surfaces or bores is of great importance, since the cutting of such surfaces has always been a difficult task due to the tendency to chatter and gouge.

I do not intend to be limited to the details shown and described except as they are made essential by the appended claims.

I claim:

1. A diamond type dressing tool comprising, a shank one end of which is hollow in the form of an elongated cylindrical cavity the principal axis of which coincides with the principal axis of said shank, an elongated cylindrical plunger one end of which fits telescopically within said cavity while the other end projects outwardly therefrom, said projecting plunger end having a smaller diameter than said telescopically fitting end thereof with a tapered circumferential shoulder intermediate said different diameter ends of the plunger, said telescopically fitting end being smaller than said cylindrical cavity so as to allow side play of the plunger therein, said telescopically fitting end having an enlarged band shaped portion adjacent the rear end thereof having a rounded surface whereby it pivotally interfits within said cavity, the wall of said hollow end being inwardly deformed at the outer end of said cavity so as to form circumferential shoulders for engaging said tapered plunger shoulder thereby retaining said plunger within said cavity and limiting the outermost position thereof, a spring disposed in said cavity with one end supported by the inner end of said cavity and with the other end compressed against said plunger so as to bias and project the latter into said outermost position thereof, and a diamond cutting element secured on the projecting end of said plunger.

2. The diamond dressing tool called for in claim 1 wherein said circumferential shoulder intermediate the projecting end of said plunger with said telescopically fitting end thereof is frusto-conical in shape where when it is spring biased against said circumferential retaining shoulder formed at the hollow end of said shank, said plunger will be coaxially aligned within said shank.

FRED M. BLEY.

REFERENCES CITED

The following references are of record in the file of this patent:

UNITED STATES PATENTS

| Number    | Name        | Date          |
|-----------|-------------|---------------|
| 1,033,749 | Strong      | July 23, 1912 |
| 1,191,746 | Thomson     | July 18, 1916 |
| 1,393,667 | Crampton    | Oct. 11, 1921 |
| 2,154,718 | Bannon      | Apr. 18, 1939 |
| 2,292,957 | Meeson et al. | Aug. 11, 1942 |

FOREIGN PATENTS

| Number  | Country | Date        |
|---------|---------|-------------|
| 374,816 | Germany | May 2, 1923 |